United States Patent [19]

Smith et al.

[11] Patent Number: 4,784,352
[45] Date of Patent: Nov. 15, 1988

[54] FORWARD POSTURE SUPPORT SEAT SYSTEM

[75] Inventors: Eugene A. Smith, Vashon, Wash.; Barbara J. Courter, El Segundo, Calif.; Kenton M. Munson, Arcadia, Calif.; Stephen G. Wurst, Orange, Calif.

[73] Assignee: Rockwell International Corporation, El Segundo, Calif.

[21] Appl. No.: 865,508

[22] Filed: May 20, 1986

[51] Int. Cl.$^4$ .............................................. B64D 25/04
[52] U.S. Cl. .............................. 244/122 AG; 280/748; 280/751; 280/753; 297/216
[58] Field of Search ................. 244/121, 122; 280/748, 280/751, 753; 297/216, 488, 487, 464, 465, 466, 486, 410

[56] References Cited

U.S. PATENT DOCUMENTS

| | | | |
|---|---|---|---|
| 1,239,041 | 9/1917 | Roe | 244/122 B |
| 2,634,802 | 4/1953 | Stumm | 244/122 B |
| 2,707,087 | 4/1955 | Bradley et al. | 244/122 B |
| 3,574,398 | 4/1971 | Hairgrove | 297/410 |

FOREIGN PATENT DOCUMENTS

| | | | |
|---|---|---|---|
| 356862 | 9/1931 | United Kingdom | 244/122 B |
| 978422 | 12/1964 | United Kingdom | 244/122 AG |

Primary Examiner—Galen Barefoot
Attorney, Agent, or Firm—Charles T. Silberberg; Chris Papageorge

[57] ABSTRACT

A seat system for a crewmember of an aircraft is disclosed which provides support and restraint to the crewmember while in a crouched as well as an erect position. The crewmember is secured by means of a strap harness to an insert which is positioned behind and in contact with the crewmember's back. The insert is rotatably connected to the seat providing multi-axis rotation to the insert relative to the seat. The insert's multi-axis rotation allows the crewmember to turn in the seat while secured to the insert. The insert also has a limited degree of translational movement toward as well as away from its connection to the seat; this allows the crewmember to lean forward, backward and laterally in the seat while still secured to the insert. A mechanism locks the insert into a desired forwardly inclined position. Instead of an insert, however, the crewmember's upper torso may be directly connected, at the crewmember's back, to the seat by means of a strap system or a rigid extendable support member. The crewmember is securely retained in the crouched position on ejection for enhanced protection from the forces of ejection from the aircraft (and optionally during certain high acceleration aircraft maneuvers).

28 Claims, 7 Drawing Sheets

FORWARD POSTURE SUPPORT SEAT SYSTEM

BACKGROUND OF THE INVENTION

1 Field of the Invention

This invention relates to a novel seat system for protecting the crew member of an aircraft from high "g" forces resulting from aircraft maneuvers and/or emergency ejection from aircraft while affording the crewmember a degree of mobility in the seat.

Modern high performance fighter aircraft are capable of flight maneuvers which subject the crewmember to very high forces of acceleration. Severe stresses are placed on the crewmember by such aircraft maneuvers. Fighter aircraft and their crewmembers have been lost as a result of pilot blackout resulting from aircraft maneuvers beyond the tolerance of the human crewmember. In addition, if a fighter aircraft is out of control or if an aircraft crash is imminent, the motion of the aircraft can be such as to make ejection of the pilot therefrom result in subjection of the pilot to ejection forces which are beyond his tolerance. Thus, in some emergency situations, ejection of the pilot from the aircraft in a conventional manner will result in severe injury or death.

2. Statement of the Prior Art

Some prior art methods of protecting the crewmember from the stresses of "g" forces require that the crewmember be placed in a prone position. This position purportedly enhances the crewmember's ability to tolerate "g" forces acting perpendicular to the spine resulting from many types of aircraft maneuvers. However, this prone position also hampers the pilot's visibility and may make it more awkward for the pilot to operate the controls. In addition, such a prone position makes it more difficult to safely eject the crewmember in the event of an emergency due to the dimensions of the seat required. The excessive length of the seat also increases the size of the crewmember/seat ejection envelope. This increases the size of the cockpit required to accommodate such systems. An example of a prior art seating system placing the pilot in a prone position is U.S. Pat. No. 2,369,258 to Shebat.

Other prior art seating systems for aircraft crewmembers provide the capability of altering the seating position (and sometimes the seating position angle as well) of the pilot or crewmember as required for various flight conditions. Such systems thus place the crewmember in a reclined position in order to enhance "g" tolerance resulting from certain aircraft maneuvers. Such systems also allow the crewmember to be in a nearly upright seated position when flight conditions require the crewmember to have good visibility and good dexterity for operating the controls. However, another disadvantage with such systems is that powering the seat to so alter its position increases the complexity of the system and its weight; moreover, movement of the seat to a desired position may not be fast enough to accommodate flight requirements, particularly under combat conditions or for ejection. Two examples of such prior art seating systems are U.S. Pat. No. 3,981,465 to Sinnett and U.S Pat. No. 4,004,763 to Bunnell.

Other prior art systems for providing the crewmember protection from "g" forces include strap restraints and cord systems for retaining the pilot or crewmember firmly against the seat. Such systems may use a pair of cords connecting the sides of the helmet to the shoulders of the pilot or crewmember. Another pair of cords are attached to the first pair and secured to a reeling in device at the back of the seat in order to pull the pilot's helmet and shoulders firmly against the seat upon the application of forces of acceleration. Such restraint systems may be unduly complex and severely limit the movement of the crewmember in the seat. An example of such restraint systems is U.S. Pat. No. 3,329,464 to Barwood.

Some prior art systems use a pad positioned over the chest of the crewmember to apply restraint directly to the crewmember's chest. However, such chest pads are functionally the same as and thus no more effective than the strap restraint system described hereinabove. Two examples of such prior art restraint systems using chest pads are U.S. Pat. No. 3,852,679 to DeLavenne and U.S. Pat. No. 4,300,799 to Cunningham.

A seat system is thus needed that will provide protection against compression of the vertebrae of the spine caused by high forces of acceleration resulting from ejection from the aircraft as well as aircraft maneuvers, while still allowing sufficient pilot mobility, good visibility, and good access to the controls.

SUMMARY OF THE INVENTION

It is a primary object of the present invention to provide protection to the crewmember of an aircraft from the forces of acceleration resulting from ejection from the aircraft.

It is another object of the present invention to provide a seat system for the crewmember of an aircraft which retains and supports the crewmember in a forward posture position.

It is still another object of the present invention to provide a seat system which retains the crewmember in an aerodynamically stable, supported position upon ejection from the aircraft to provide protection from wind blast.

It is also an object of the present invention to provide protection to the crewmember of an aircraft from the forces of acceleration resulting from aircraft maneuvers.

It is also an object of the present invention to provide rapid packaging of the crewmember into a restrained forward posture position for ejection from the aircraft.

It is another object of the present invention to provide a forward posture support seat system which allows the crewmember good mobility in the seat, good visibility of the instrument panel and the surrounding environment and good manual access to the controls.

The system of the present invention is specifically designed to provide protection to the crewmember of an aircraft or other vehicle from high forces of acceleration acting approximately in a positive direction inclined aft from the z axis of the aircraft. The system is thus designed for use with an ejection system which exerts its ejection forces in that general direction. High forces of acceleration in that general direction also typically result from certain aircraft maneuvers. This system also securely retains the crewmember in a forward posture in order to reduce body motions such as flailing of the crewmember's limbs resulting from high ejection forces or wind blast after ejection.

Applicants have determined that it is more advantageous that the crewmember of a highly maneuverable aircraft such as a fighter be placed in a forward posture position rather than a reclined posture position because the forward posture position provides better protection from the high forces of acceleration caused by ejection from the aircraft as well as many aircraft maneuvers. In the forward posture position the forces of ejection act in directions generally more normal to the spine than in the reclined position. A significant advantage of the forward posture ejection position is that it provides a more compact ejection envelope which is more amenable to compact crew stations. In addition, during flight the forward posture position allows the crewmember to have excellent visibility of the flight path, instruments and control system in order to enable the crewmember to properly control the aircraft.

The seat system includes a seat having a seatback and a seatpan rigidly secured thereto. A rocket motor typically providing propulsion to the seat for ejection from the aircraft is suitably mounted on the underside of the seatpan or on the back of the seatback. A torso support includes a seatback insert which is positioned between the crewmember's back and the seatback and is movable from a generally upright position against (or flush with) the seatback to a forwardly inclined position. The crewmember is suitably secured to the seatback insert by means of a conventional strap harness assembly mounted on the insert. The seatback insert thus provides support and restraint to the crewmember when the crewmember is in both a forward posture position and a generally upright position. When the crewmember is supported and restrained in a forwardly inclined position, he nevertheless is still able to look forward out of the cockpit as well as observe the instrument panel and operate the controls in front of him. Thus, the system of the present invention does not detract from the crewmember's ability to observe or to operate the controls as do many other systems which place the crewmember in a prone or reclined position.

In order to securely retain the crewmember in a stable forward posture position throughout the ejection sequence, the seatback insert is locked in the forwardly inclined position. In order to lock the seatback insert in a forward position, a pair of hydraulic or pneumatic piston and cylinder structures are mounted between and connected to the seatback insert and the seatback. The piston and cylinder structures hydraulically or pneumatically lock into a desired extended position at the onset of the ejection sequence. The insert is thus locked into position placing the crewmember in a forward posture in which the forces of ejection act approximately normal to the spine of the appropriately restrained crewmember., the insert affords him maximum protection from injury to the spine caused by compression of the vertebrae.

Another embodiment of the invention incorporates a harness passing under the crewmember's shoulders and armpits rather than over his shoulders. Instead of being connected to an insert, the harness is connected directly to the -seatback by means of one or more straps. The straps lock when the harness is in a desired forward posture position thereby providing restraint to the crewmember's upper torso from "g" forces.

Still another embodiment incorporates a similar harness. But, the harness is connected to a rigid support member positioned behind the crewmember. The support member is connected to the seatpan or seatback and is extendable and retractable allowing the harness system to move fore and aft. This enables the crewmember to move from an erect to a forward posture position.

Another important advantage of the invention is that the crewmember's forward posture position may result in a more compact seat system during ejection than many other reclined position seat systems. The compactness of the seat structure may also yield a system which is more easily balanced for propulsion by the rocket motor underneath the seat.

In order to accommodate movement of the crewmember in the seat, the seatback insert is connected to the seat by means of a multi-axis rotatable and extendable joint. The joint provides three dimensional rotation to the seatback insert and provides translational movement to the insert directionally away from and toward the seat. The translational and rotational movements of the insert enable it to accommodate turning as well as forward, backward and lateral leaning movements of the crewmember who is secured by the harness thereto. Thus, the insert affords the crewmember a high degree of mobility within the seat enabling him to turn to view external objects such as enemy aircraft as well as to lean forward or backward into or out of the crouched position as required in order to more effectively withstand the high forces of acceleration caused by aircraft maneuvers.

It is thus apparent that the seat system enhances the safety and effectiveness of aircraft ejection and additionally provides a high degree of protection from the forces of acceleration caused by aircraft maneuvers and/or ejection from the aircraft. The system of the present invention affords these advantages without compromising the crewmember's good visibility out of the cockpit and easy access to the controls and instrument panel. In addition, the system of the present invention affords the crewmember a high degree of mobility within the seat thereby enhancing the crewmember's awareness of an air combat situation as well as his ability to control the aircraft.

BRIEF DESCRIPTION OF THE DRAWINGS

FIG. 3a is a perspective view of the insert and telescoping strut of the embodiment of the seat system illustrated in FIGS. 1, 2, and 3.

FIG. 3b is a side view of the insert and telescoping strut shown in FIG. 3a.

DETAILED DESCRIPTION OF THE PREFERRED EMBODIMENTS

Figure 1:
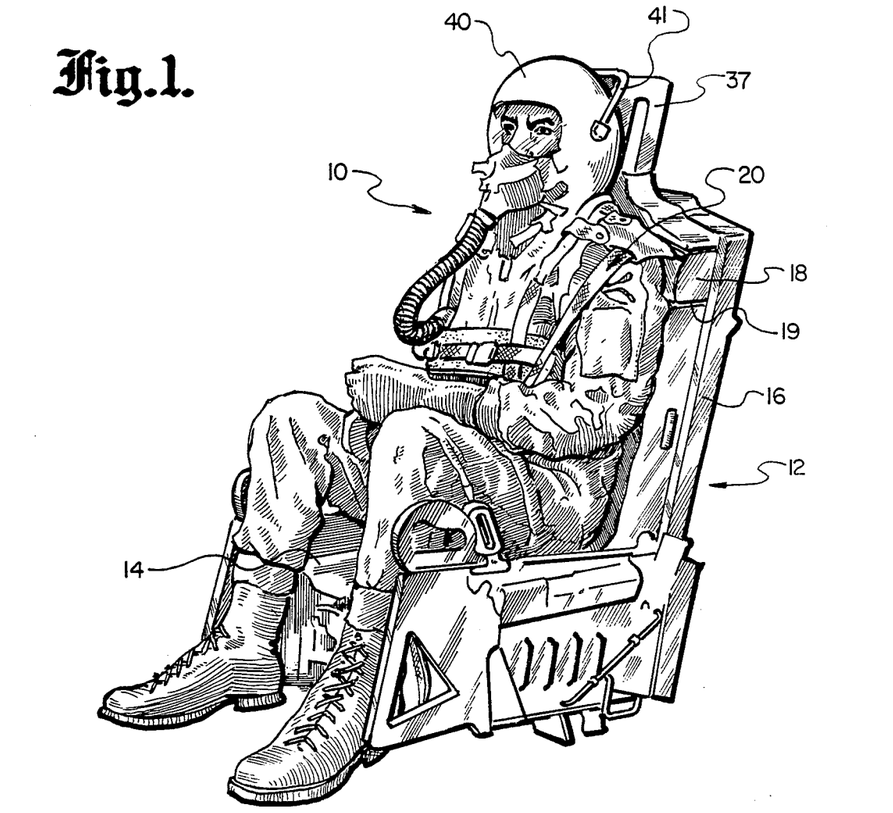
FIG. 1 is a perspective view of the seat system showing a crewmember seated therein.

Referring to the drawings, FIG. 1 shows an aircraft crewmember 10 seated in a seat generally designated by the numeral 12. Seat 12 includes a seatpan 14, seatback 16 and a lower seatback 17. Seatback 16 is preferably rigidly secured to seatpan 14. A torso support includes a seatback insert 18 which is disposed between the back of the crewmember 10 and the seatback 16. The crewmember's back is in contact with the insert 18 so that insert 18 provides support to the crewmember's torso.

When the crewmember is in a leaned back or upright position, insert 18 fits into a recess 19 in the seatback 16 so that the forward surface of the insert is flush with the forward surface of the seatback 16. This allows firm support to be provided to the crewmember's back by the seat back 16 when the crewmember is in a generally upright or leaned back position (which may be inclined as much as 20° from the z axis of the aircraft) and enhances the crewmember's comfort when in that position.

There is a harness system 20 connected to the insert 18. The harness 20 is a conventional strap type of harness which fits over the crewmember's shoulders and across his chest so as to securely retain the crewmember 10 against insert 18.

Figure 3:
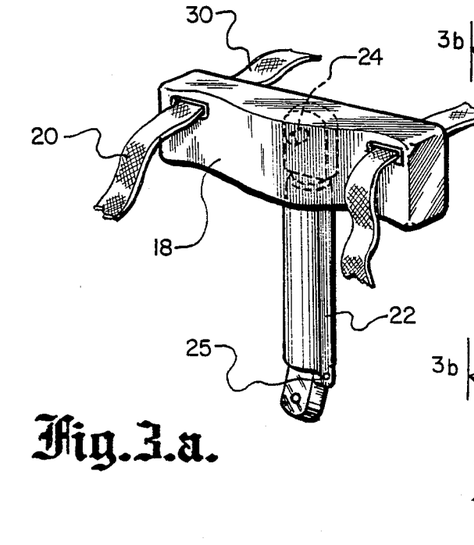
FIG. 3 is a side view of the seat system of FIGS. 1 and 2 showing the crewmember in a forward posture position with his legs elevated during high "g" aircraft maneuvers.
Figure 4:
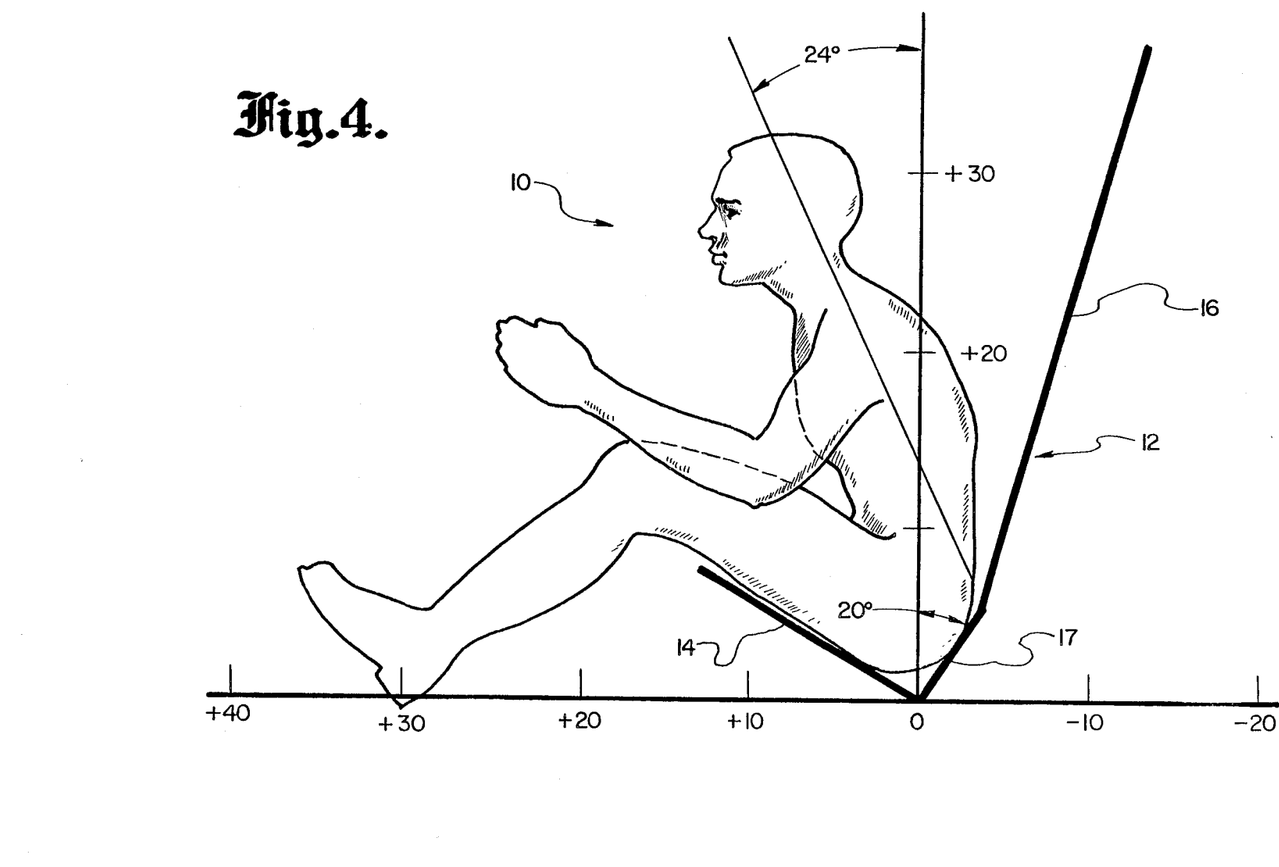
FIG. 4 is a diagrammatic view of the seat system showing more accurately the forward posture position of the crewmember during high "g" aircraft maneuvers and the angular configuration of the seat parts.

The insert 18 preferably at a lower portion thereof is connected to the seat 12 preferably proximal to the connection between seatback 16 and lower seatback 17 (FIG. 3). The connection point is preferably on the seatback approximately located where the crewmember's lower back bends when leaning forward (typically 6 to 7 inches above seatpan 14). Insert 18 in conjunction with harness 20 and seatback 16 provides restraint to the crewmember 10 from forces of acceleration.

Referring now to FIGS. 2, 3, 3a, and 3b, there is shown one means of providing translational movement to the insert 18 to enable it to accommodate leaning movements of the crewmember 10 which incorporates a telescoping strut 22 connected to and mounted between the insert 18 and the seat 12. Strut 22 also provides generally vertical support to the insert 18. In this embodiment, insert 18 is preferably a rigid bar positioned approximately at the crewmember's shoulderblades and is of a sufficient dimensional height (approximately 6 to 8 inches) to be able to firmly retain the crewmember in the desired forward posture position. The top of the insert 18 is also at a high enough location on the crewmember's back (preferable slightly higher than the crewmember's shoulders for suspension) so that when the crewmember's torso is secured thereto the insert 18 when locked in position acts to unload the crewmember's spine thereby improving the spine's tolerance to compressive "g" forces. The insert 18 is also preferably contoured to conform to the crewmember's back for comfort and for more even distribution of the restraint forces. A rotatable, preferably ball type of joint 24 may be used where the telescoping strut 22 is connected to the insert 18. The joint 24 thus enables the insert 18 to have multi-axis rotation in at least two dimensions. In addition, the telescoping strut 22 allows the insert to move into and away from its connection point to the seat 12.

Strut 22 also has a rotatable joint 25 at its connection to the seatback 16. The connection point for strut 22 is located preferably on the seatback 16 proximal to the lower seatback 17. The connection point is preferably approximately 6 to 7 inches from the seatpan 14., thus, the connection point is located approximately adjacent to the point where the crewmember's back bends when he leans forward. Thus, the rotational movement of the joints 24 and 25 and the telescoping movement of the strut 22 allow the insert 18 to accommodate turning and leaning movements of the crewmember's upper torso.

Figure 5:
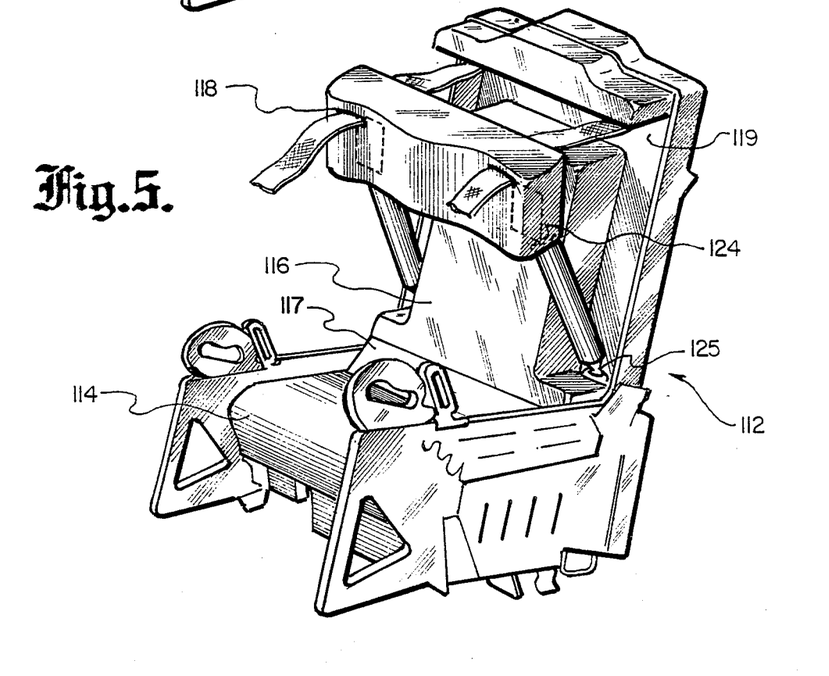
FIG. 5 shows another embodiment of the invention similar to that shown in FIGS. 1, 2, and 3 except that a pair of telescoping struts are used.

Instead of a single strut, a pair of telescoping struts 122 can be mounted between the insert 118 and the seat 112 as shown in FIG. 5. Similarly, the pair of struts 122 also has preferably universal or ball joints 124 at the connection points of the strut 122 and insert 118 and has preferably universal or ball joints 125 at the connection points of the seat back 116 and struts 122. In conjunction with the telescoping motion of struts 122, joints 124 and 125 also allow multi-axis rotation of the insert.

In another embodiment (FIG. 7), the insert 218 which includes flexible panel or surface 223 and frame 221 is preferably connected to the seat 212 by means of a pair of ball and rod type structures or members 222 mounted on the insert moving in a pair of slots 224 in the seat 212. The ball and rod structures 222 move up and down in slots 224 providing translational movement to the insert 218. Structures 222 and 224 preferably also allow translational movement of the insert away from and/or toward the seat. This allows the insert 218 to move with the torso of the crewmember 210 in order to accommodate leaning movements of the crewmember 210. The slot structures 224 may also have a curved shape so that each ball and rod structure may move independently of the other in its slot 224 to allow the insert 218 to turn laterally as well as bend forward and backward in order to accommodate turning and/or leaning movements of the crewmember 210 who is secured thereto.

Figure 7:
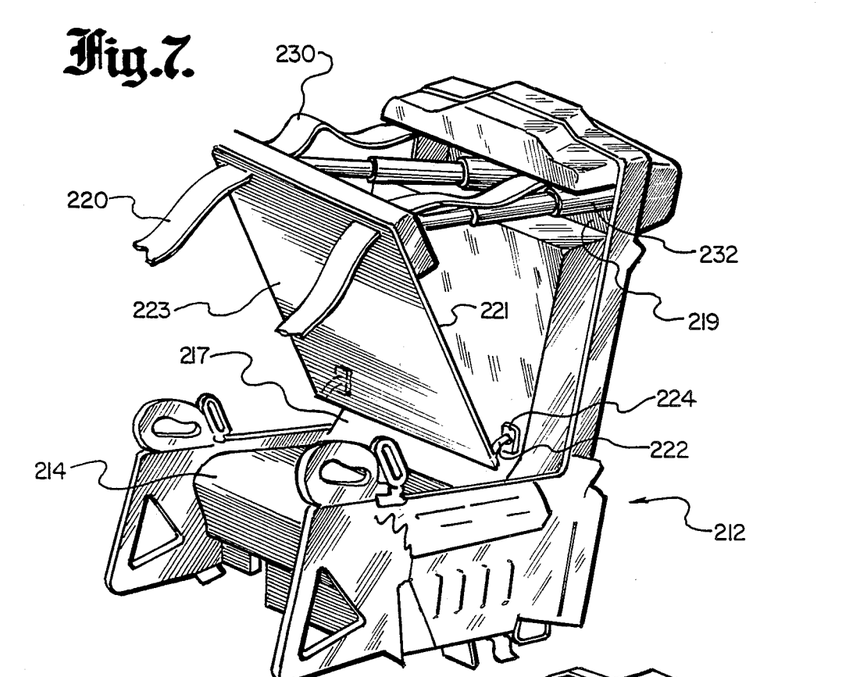
FIG. 7 shows another embodiment of the invention incorporating a flexible frame insert and a pair of telescoping struts mounted between an upper portion of the insert and an upper portion of the seatback.

It is desirable that the insert 218 conform to the curves of the crewmember's back so that the insert 218 provides more comfort to the crewmember. The insert 218 may have a flexible frame 221 or surface 223 thereby enabling it to conform more easily to the contours of the crewmember's back. For example, the surface 223 may be made of a fine mesh material such as nylon over a flexible frame. This gives the insert strength yet also enables it to conform generally to the shape of the crewmember's back. In addition, this flexibility also accommodates bending movements of the crewmember.

There is also preferably an insert restraint system (FIGS. 1-3, 3a and 3b) which may simply be a pair of straps 30 connecting the insert 18 at its upper portion to the seatback 16. Straps 30 restrain forward movement of the insert 18 relative to the seatback 16. When the straps 30 are used to restrain forward movement of the insert 18, strap 31 connects harness 20 to the seatpan 14 or the floor of the aircraft (preferably to an inertia reel 33 mounted thereon). Inertia reel 33 responds to a "g" force of a certain threshold magnitude to lock strap 31 into position during ejection to prevent undesired aft movement of the crewmember's upper toro and retain the crewmember in a desired forward posture position. Inertia reel 33 may also lock strap 31 into position during flight maneuvers in response to "g" forces of a certain threshold magnitude to retain the crewmember in a desired forward posture position and unlock when "g" forces fall below a certain threshold magnitude.

Figure 6:
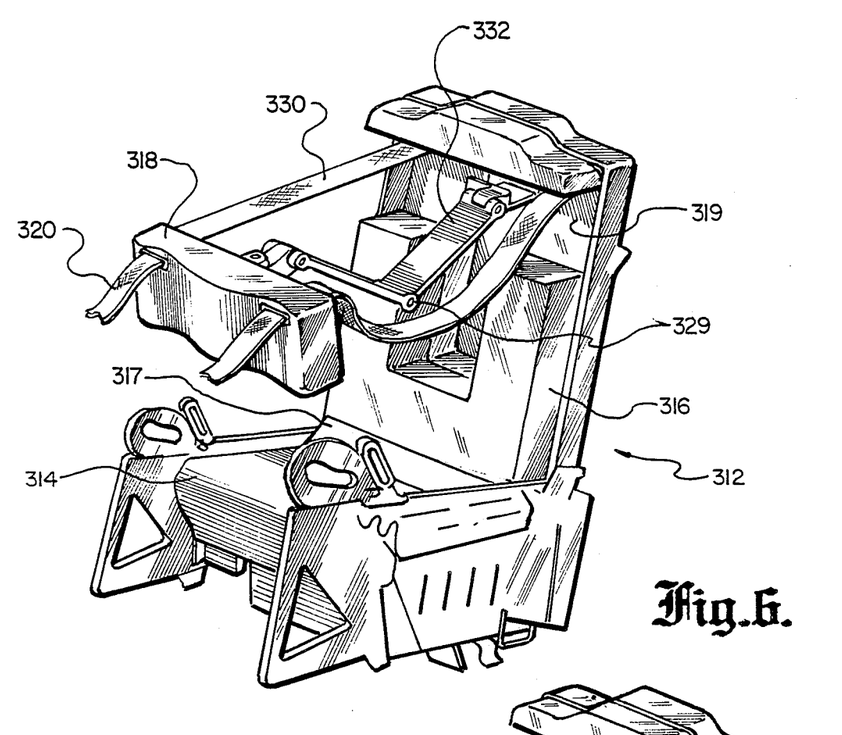
FIG. 6 shows another embodiment of the invention wherein the insert is connected to the seatback by means of one pair of bendable bars.

During ejection, it is desirable that the insert 18 securely retain the crewmember 10 in a forward leaning position. In a forward leaning position the forces of ejection act normal to the crewmember's spine alleviating compressive forces on the vertebrae. Although the forward leaning or forward posture position is between 0° and 45° inclined fore of the z axis of the aircraft, the preferred angle of inclination is approximately 24° inclined fore of the z axis of the aircraft (See FIG. 6). In comparison with the upright or reclined positions, the forward leaning position may provide better protection to the crewmember from wind blast and other ejection forces which may otherwise tend to buffet the crewmember 10 causing flailing limbs and resulting in injury thereto. Therefore, the insert preferably locks into a desired forward posture position for ejection from the aircraft. Specifically, movement of the strut 22 is preferably locked out at the inception of the ejection sequence preventing rotational and translational movements of the insert 18, and a locking means (not shown) is provided to structures 22 and 24 to also prevent similar movement of insert 18. In addition, insert restraint 30 also further assists in preventing forward movement of insert 10 during the ejection phase.

One embodiment of the invention (FIG. 7) incorporates a pair of hydraulic or pneumatic piston/cylinder structures or members 232 to secure the insert 218 to the seatback 216 and restrain the insert 218 from excessive forward movement; the piston/cylinder structures are mounted between and connected to the seatback 216 and the insert 218 preferably at its upper portion. During the ejection sequence, the piston and cylinder structures 232 are preferably hydraulically or pneumatically extended and hydraulically or pneumatically locked in an extended position which places the insert 218 in a desired forward position for ejection.

Another embodiment (FIG. 6) uses a pair of bars 332 rotatably mounted between the insert 318 and the seatback 316 preferably at an upper, central portion of each; the hinged connections or joints 333 at both the seatback 316 and insert 318 allow the bars to pivot about the connections 333; the bars are interconnected at one end by hinged connection 329 to form a central axis about which the bars pivot. The rotation of the oars at the axis thereby allows the insert 318 to move forward and backward. However, when the insert 318 is in a desired forward position, each pair of the bars 332 are in longitudinal alignment and can be mechanically locked into that position. The joint 329 at the central axis as well as both connection points 333 at the seatback 316 and insert 318 are preferably automatically lockable (by any suitable means, not shown) at the inception of the ejection sequence.

Figure 8:
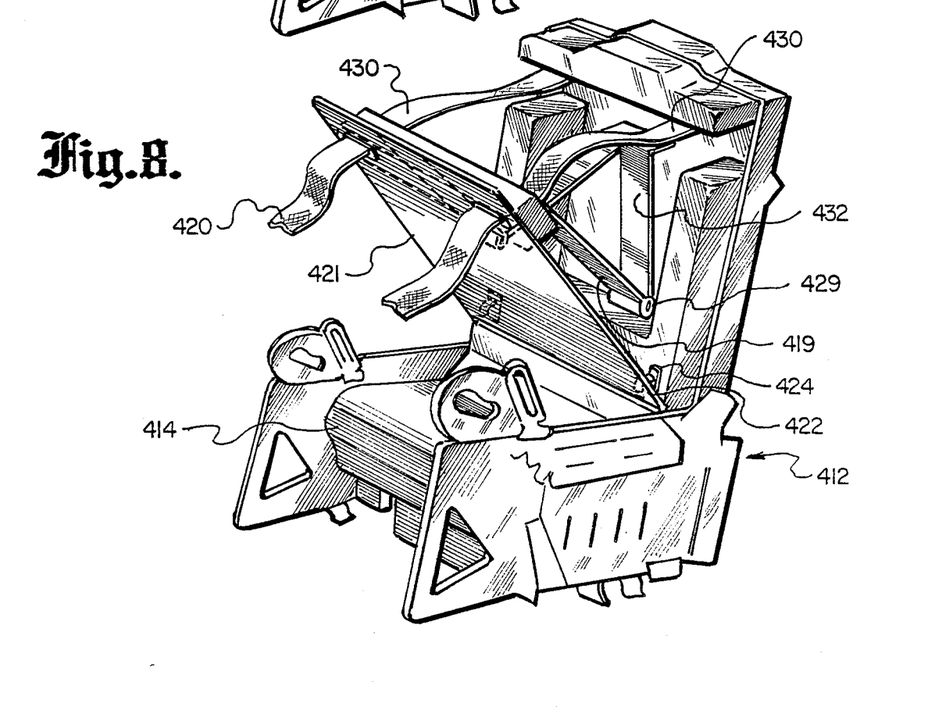
FIG. 8 shows still another embodiment of the invention wherein the insert is connected to the seatback by means of two pairs of bendable bars.

Still another embodiment (FIG. 8) uses two pairs of bars 432 as above in a "V" configuration. One end of each bar is connected to one side of the insert 418 while the other end of each is connected to a preferably central portion of the seatback 416. As with the other embodiment using a single pair of bars, all the joints are preferably lockable. Thus, with a turning movement of the crewmember in the seat 412, the insert 418 rotates causing one pair of the bars 432 to bend while the other pair remains straight.

Figure 9:
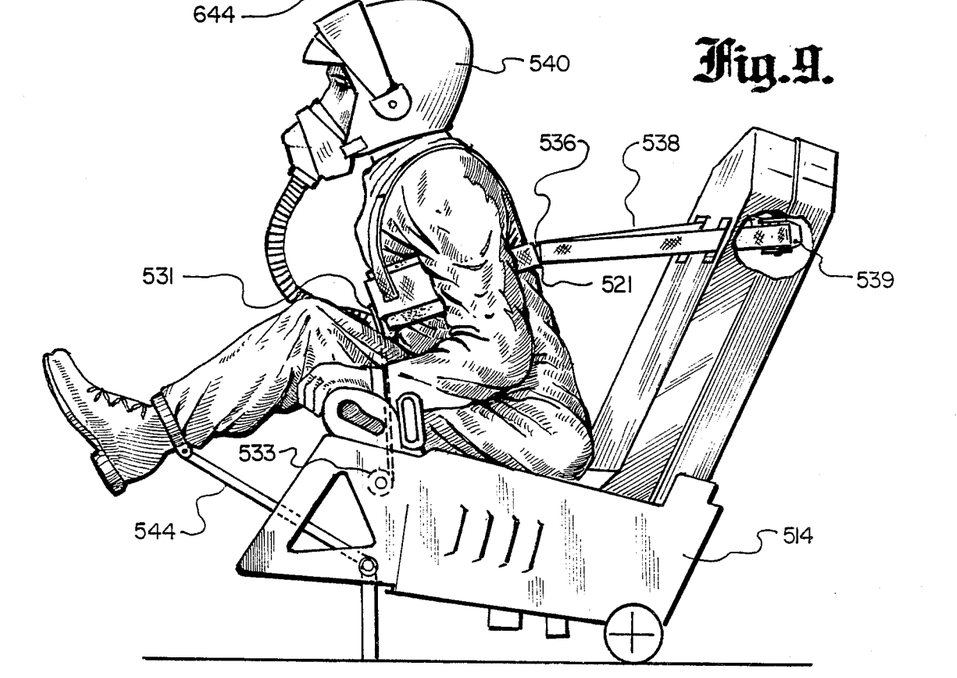
FIG. 9 shows another embodiment of the invention wherein the crewmember is movably connected to the seatback by means of a harness system.
Figure 11:
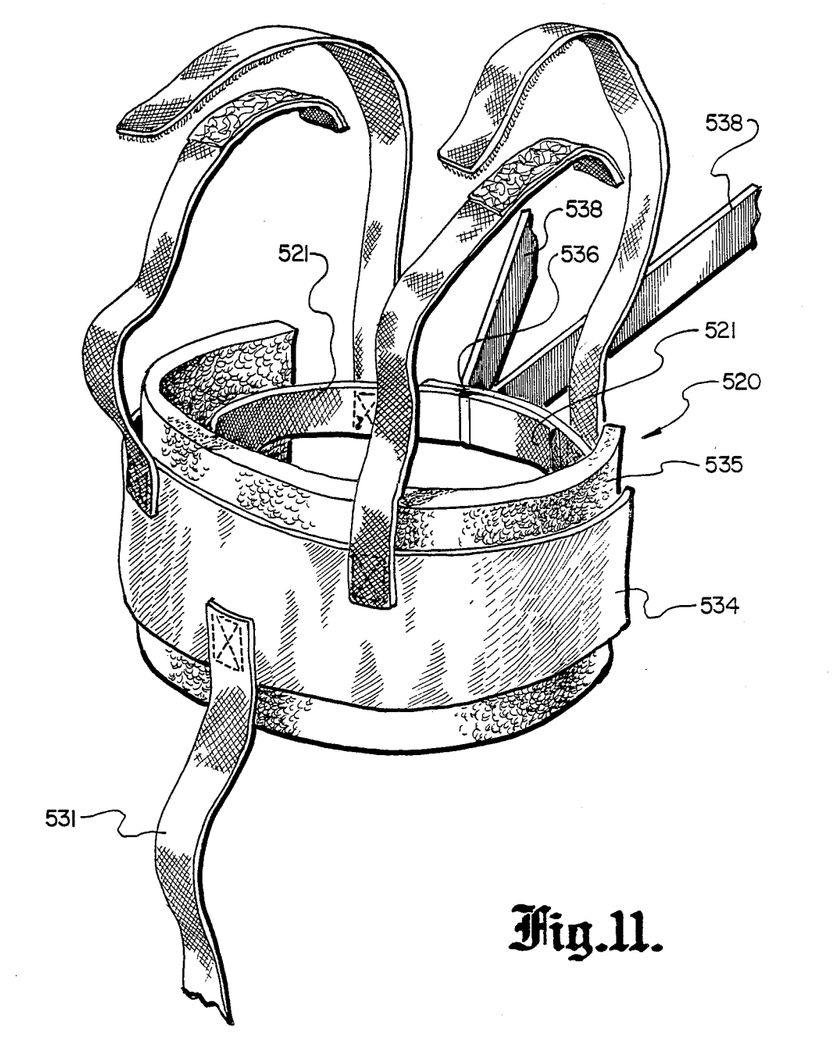
FIG. 11 is a more detailed view of the harness system of FIG. 9.

Instead of using an insert, another embodiment (FIG. 9) of the invention connects the crewmember's upper torso directly to the seatback or seatpan. In this embodiment, the torso support includes a harness system 520 (FIG. 11) but not the insert. Harness system 520 includes straps 521 which pass under the crewmember's shoulders and armpits and preferably connect to a chest pad or web 534 positioned approximately over the crewmember's solar plexus. Padding 535 may also be provided between the web 534 and the crewmember's chest. Chest pad 534 may also be integral with the crewmember's suit. However, rather than utilizing a chest pad 534, the harness straps 521 may simply pass across the crewmember's chest. Straps 521 either connect directly to the seatback 516 at a level higher than the solar plexus or shoulder blades or pass completely around the lateral and back sides of the ribcage merging at a point 536 approximately between the crewmember's shoulder blades. From the connection point 536 either two support straps 538 may connect to the lateral sides of the seatback 516 or just one strap 538 may connect to a central location on the seatback 516 at a higher level than the point 536 to provide restraint from forces of acceleration acting in a direction inclined aft from the z axis of the aircraft. Alternatively, the straps 538 may connect directly to the crewmember's suit. The harness system 520 preferably also includes an inertia reel 539 connected at the seatback 516 to the straps 538. The reel 539 locks the straps 538 preventing forward movement when the crewmember is in the desired forward posture position. Thus, restraint is applied from "g" forces. In addition, strap 531 connects straps 521 or preferably pad 534 preferably to reel 533 mounted on the seatpan 514 or the floor of the aircraft. Inertia reel 533 locks strap 531 into position during the acceleration of ejection to prevent undesired aft movement of the crewmember's upper torso and retain also lock into position during flight maneuvers to retain the crewmember in a desired forward posture position.

Figure 10:
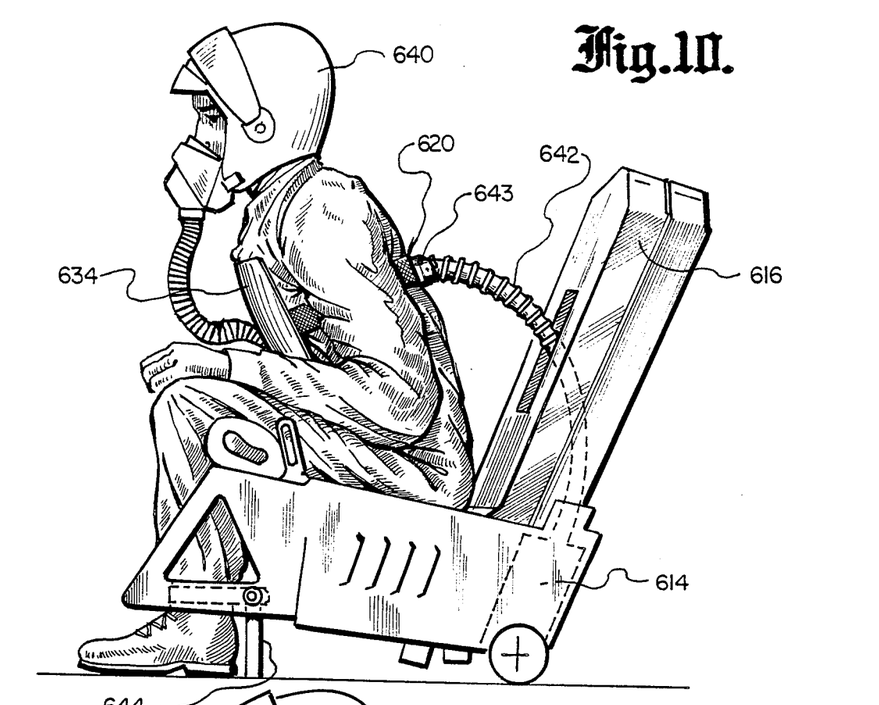
FIG. 10 shows another embodiment of the invention wherein the crewmember is movably connected to the seat by means of a chest pad and rigid support member positioned behind the crewmember.

Instead of incorporating straps 521, another embodiment (FIG. 10) may incorporate a support member 642 connecting the harness system 620 to the seatback 616 or, alternatively, to the seatpan 614. The support member 642 is rigid yet also extendable and retractable from seatback 616 or seatpan 614 to allow movement of the crewmember's upper toro back and forth., thus, the support member 642 allows movement of the crewmember from an upright position in the seat to a forward posture position. There is preferably a multi-axis joint such as a U-joint 643 at the connection point of the support member 642 to the harness 620. U-joint 643 will thus enable pivotal movement of the crewmember's upper torso about the U-joint 643 enabling the crewmember to turn his upper torso while secured in the seat.

The unique structure of the insert 18 thus provides the range of movement necessary to retain and support the crewmember 10 in a desired forward posture thereby enhancing the crewmember's ability to withstand the high forces of acceleration resulting from aircraft maneuvers and ejection from the aircraft.

It is also desirable to provide a firm support for the back of the head of crewmember 10 particularly when the insert 18 is in the forward position during ejection from the aircraft. For this reason, a head support 37

(FIGS. 2 and 3) is preferably slidably mounted on the insert 18 and positioned approximately behind the crewmember's head. Head support 37 is extendable from the insert 18 into a position directly behind the crewmember's head for contact therewith in order to provide support thereto from forces of acceleration or from wind blast during ejection. Moreover, the head support 37 may be retracted fully into the insert 18 in order to allow the crewmember to tilt his head back in order to look up as needed during flight.

Figure 2:
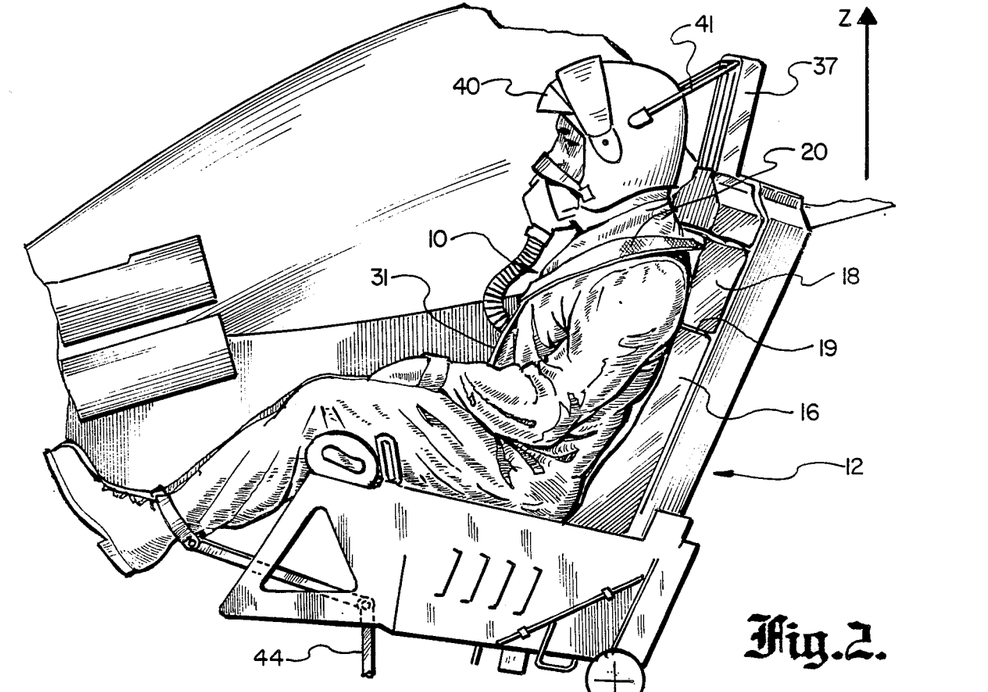
FIG. 2 is a perspective side view of the seat system of FIG. 1 showing the crewmember seated therein in an aircraft cockpit with his legs elevated.

Wind blast and ejection forces may be quite severe during ejection resulting in buffeting of the crewmember's head potentially resulting in head or neck injury. In addition, the forces of acceleration resulting from ejection or aircraft maneuvers may tend to move the crewmember's head forward with sufficient force to cause head for neck injury. Therefore, a means to firmly secure the crewmember's helmet 40 against the head support 37 may be employed. For example, a releasable cable or strap or pair of straps 41 may connect the helmet 40 to the support 37 so as to restrain the helmet 40 against the support 37 upon ejection of the crewmember 10 from the aircraft.

Alternatively, strap 41 may be connected directly to the backrest 16 rather than the support 37. The strap 41 during aircraft maneuvering or ejection restrains the crewmember's head from forward movement when the crewmember is in a desired forward posture position.

In order to prevent any of a crewmember's limbs from catching the windblast after ejection and imparting an angular momentum to the crewmember thereby resulting in a dangerous high speed spin thereof, it is necessary that the crewmember and seat be a more compact and drawn in unit. Consequently, it is desirable that the crewmember's legs be drawn in close to his torso with his feet tucked under his torso into a generally squatting position. In order to accomplish this, cords 44 connect the crewmember's lower legs to the aircraft and during ejection draw the crewmember's feet under his torso. Alternatively, however, the crewmember's lower legs may be drawn in toward the seat only to the point where his lower legs are approximately parallel to the acceleration forces of ejection.

In addition, a cover (not shown) is provided to cover the gap between the insert 18 and the backrest 16. The cover is extendable in order to cover the gap resulting when the crewmember leans forward into a forward posture position separating the insert 18 from the backrest 16. The cover may, for example, be accordion shaped and firmly secured at its ends to the insert 18 and seatback 16, or it may be a material which is sufficiently flexible to simply roll up onto rollers (not shown) suitably mounted on the seatback 16 or insert 18.

The cover provides reduced aerodynamic drag and enhances crewmember/seat stability during the ejection and free flight phase. It prevents windblast after ejection from causing air turbulence within the gap and reduces buffeting of the seat 12 and crewmember 10. The cover is preferably plastic or other suitable type of material which is sufficiently strong to withstand windblast.

Thus, it is apparent that there has been provided, in accordance with the invention, a forward posture support seat system that fully satisfies the objectives, aims, and advantages set forth above. It is to be understood that all terms used herein are descriptive rather than limiting. Although the invention has been described in conjunction with the specific embodiments set forth above, many alternatives, embodiments, modifications, and variations will be apparent to those skilled in the art in light of the disclosure set forth above. Accordingly, it is intended to include all such alternatives, embodiments, modifications, and variations that fall within the spirit and scope of the invention as set forth in the claims hereinbelow.

We claim:

1. A forward posture support seat system for a crewmember of a vehicle comprising:
a seat, said seat having a seat back and a seat pan;
a torso support means secured to the crewmember's upper torso for supporting the crewmember's upper torso while the crewmember is seated in said seat in a crouched over position, said torso support means connected to said seat behind the crewmember, said torso support means being lockable when the crewmember is in a crouched over position such that fore and aft motion of the crewmember is substantially precluded.

2. The system of claim 1 wherein said torso support means when not locked while the crewmember is in a crouched over position allows movement of the crewmember in a generally fore and aft direction relative to said seat back such that the crewmember may be in a generally upright position while seated in said seat.

3. The system of claim 2 wherein said torso support means provides support in the crewmember when in the generally upright position.

4. The system of claim 3 wherein said torso support means is movable in a generally fore and aft direction relative to said seat back such that said torso support means can provide support to the crewmember in a crouched over position and in a generally upright position.

5. The system of claim 2 wherein said torso support means allows said crewmember to be positioned in a range of crouched over positions.

6. The system of claim 1 wherein said torso support means is locked while said crewmember is in a crouched over position when "G" forces exceed a specified magnitude.

7. The system of claim 1 wherein said seat may be ejected from the vehicle and said torso support means is locked while said crewmember is in a crouched over position during ejection of said seat from the vehicle.

8. The system of claim 1 wherein said crewmember wears a helmet, and also includes a head support means mounted to said torso support means, said heat support means having a retractable cable connected to said helmet which normally allows fore and aft movement of said helmet relative to said torso support means but which securely restrains said helmet from forward movement relative to said torso support means under predetermined conditions.

9. The system of claim 5 wherein said range encompasses a position of from zero degrees to 45 degrees with the angle being determined by the position of the crewmember's upper torso fore of the Z-axis of the vehicle.

10. The system of claim 9 wherein when said torso support means is locked, the angle of the crouched over position is within said range.

11. The system of claim 9 wherein when said torso support means is locked, the angle of the crouched over position is substantially at a preselected angle within said range.

12. The system of claim 6 wherein said torso support means includes:
a seat back insert; and
a strut attached to said insert and to said seat back at a location proximal to the seat pan, said strut being extendable in order to provide translational movement to said insert, said strut providing support to the spinal column of the crewmember from compressive forces acting thereon.

13. The system of claim 4 wherein said torso support means includes:
a seat back insert; and
a strut attached to said insert and to said seat back at a location proximal to the seat pan, said strut being extendable in order to provide translational movement to said insert, said strut providing support to the spinal column of the crewmember from compressive forces acting thereon.

14. The system of claim 11 wherein said preselected angle is such that the crewmember's spine's tolerance to compressive "G" forces is substantially improved.

15. The system of claim 9 wherein when said torso support means is locked, the angle of the crouched over position in approximately 24°.

16. The system of claim 1 wherein said torso support means includes:
a harness system having a harness strap which passes underneath the crewmember's shoulders and armpits and across the crewmember's chest; and
a support strap connecting said harness system at a location at a back portion thereof to an opposing location at an upper portion of said seat back.

17. The system of claim 16 wherein the location on said seat back is at a higher level than the location at the back portion of said harness so that the location at the back portion and the opposing location are in approximate alignment with the center of gravity of the crewmember's upper torso in a direction inclined generally aft of the Z axis of the vehicle.

18. The system of claim 1 wherein said torso support means includes:
a seat back insert; and
a strut attached to said insert and to said seat back at a location proximal to the seat pan, said strut being extendable in order to provide translational movement to said insert, said strut providing support to the spinal column of the crewmember from compressive forces acting thereon.

19. The system of claim 18 wherein said strut is attached to said insert by a rotatable joint, said rotatable joint allowing said insert to accommodate twisting and turning movements of the crewmember's upper torso.

20. The system of claim 18 wherein said strut is connected to said seat back by a rotatable joint said rotatable joint allowing the crewmember to move from a generally upright to a crouched over position.

21. The system of claim 18 further including a shoulder harness removably connected to the upper torso of the crewmember and connected to said insert.

22. The system of claim 18 wherein said insert includes:
a flexible panel positioned against the back of the crewmember, said panel being flexible in order to generally conform to the contours of the crewmember's back; and
at least one pair of ball and rod members mounted on a bottom portion of said flexible panel movably connected to said seat back, said seat back having at least one pair of slots at a lower portion thereof for receiving said at least one pair of ball and rod members, said at least one pair of slots oriented in the general direction of the z-axis of the vehicle in order to provide translational movement to said insert to allow said insert to accommodate forward leaning movement of the crewmember's upper torso, said at least one pair of slots being curved inwardly in order to provide rotational movement of said insert relative to said seat back to accommodate lateral leaning movements of the crewmember's upper torso.

23. The system of claim 18 further including an insert restraint system connected to said insert and to said seat back, said insert restraint system precluding forward movement of said insert relative to said seat back beyond a preselected range.

24. The system of claim 23 wherein said insert restraint system includes at least one strap connected to said insert and to an upper portion of said seat back.

25. The system of claim 23 wherein said insert restraint system includes at least one piston/cylinder member connected to said insert and to an upper portion of said seat back.

26. The system of claim 23 wherein said insert restraint system includes:
at least one pair of bars in longitudinal alignment with each other, one end of one of said at least one pair of bars rotatably connected to said insert and one end of the other one of said at least one pair of bars rotatably connected to an upper portion of said seat back; and
a hinged joint connecting the other end of said one of said at least pair of bars to the other end of said other one of said at least one pair of bars so that said at least one pair of bars can bend to accommodate movement of said insert toward said seat back and straighten to allow a selected range of movement of said insert away from said seat back.

27. The system of claim 23 further including a locking means connected to said insert restraint system, said locking means responsive to forces of acceleration to lock said insert restraint system in a desired forward position to substantially preclude fore and aft movement of said insert relative to said seat back.

28. The system of claim 1 further including a means for releasably securing the crewmember to said torso support means.

* * * * *

UNITED STATES PATENT AND TRADEMARK OFFICE
CERTIFICATE OF CORRECTION

PATENT NO.   : 4,784,352
DATED        : November 15, 1988
INVENTOR(S)  : Eugene A. Smith et al It is certified that error appears in the above-identified patent and that said Letters Patent is hereby corrected as shown below:

On the Title Page, in Item [75] Inventors;

Please delete co-inventor "Kenton M. Munson".

Signed and Sealed this

Nineteenth Day of September, 1989

*Attest:*

DONALD J. QUIGG

*Attesting Officer*   *Commissioner of Patents and Trademarks*